United States Patent [19]

Vayrynen et al.

[11] Patent Number: 5,606,548
[45] Date of Patent: Feb. 25, 1997

[54] MOBILE TERMINAL HAVING IMPROVED DIGITAL CONTROL CHANNEL (DCCH) SEARCH PROCEDURE

[75] Inventors: Mika Vayrynen; Matti Ylitervo, both of Oulu, Finland

[73] Assignee: Nokia Mobile Phones Limited, Salo, Finland

[21] Appl. No.: 632,849

[22] Filed: Apr. 16, 1996

[51] Int. Cl.$^6$ .................................................. H04J 3/16
[52] U.S. Cl. ........................... 370/252; 370/337; 379/63
[58] Field of Search ............................... 370/95.1, 95.3, 370/85.7, 29, 13, 110.1; 379/63; 340/825.04, 825 C

[56] References Cited

U.S. PATENT DOCUMENTS

| | | | |
|---|---|---|---|
| 5,170,412 | 12/1992 | Massey | 375/1 |
| 5,276,691 | 1/1994 | Kivari | 371/47.1 |
| 5,396,653 | 3/1995 | Kivari et al. | 455/88 |
| 5,430,740 | 7/1995 | Kivari et al. | 371/37.1 |

FOREIGN PATENT DOCUMENTS 2239375  6/1991  United Kingdom.

OTHER PUBLICATIONS

TDMA Forum Implementation Guide: "Non–Public Mode Operation and Selection in IS–136 Compliant Mobile Stations", Version Ref. No. 2.0, Mar. 9, 1995.

*Primary Examiner*—Douglas W. Olms
*Assistant Examiner*—Matthew C. Phillips
*Attorney, Agent, or Firm*—Perman & Green

[57] ABSTRACT

A method is disclosed for a user terminal (10) to obtain access to a DCCH transmitted on a TDM radio channel of a wireless communications system that also includes at least one TDM radio channel that transmits a DTC. The DCCH and DTC are each comprised of slots partitioned into fields. A first step (a) tunes a receiver (16) to a radio channel, receives a first slot, and decodes a predetermined first field from the first slot. The predetermined first field is a 12-bit CSFP field if the radio channel conveys a DCCH, or a 12-bit CDVCC if the radio channel conveys a DTC. A second step of the method calculates a CRC over the first field to determine if the first field is the CSFP field. If yes, the user terminal assumes that the radio channel conveys the DCCH and then uses information from the DCCH to access the wireless system. If the first field is determined not to be the CSFP field, the user terminal assumes that the radio channel conveys a DTC, and then calculates a CRC over the first field to determine if the CDVCC field was correctly received. If the CDVCC field is determined to be correctly received, the user terminal calculates a CRC over the CDL field to determine if the CDL field was correctly received. If the CDL field is determined to be correctly received, and after both the CDVCC and CDL fields are correctly received from n slots, the user terminal employs the CDL field to identify a radio channel that conveys a DCCH, thereby enabling the user terminal to access the system.

5 Claims, 3 Drawing Sheets

| SYNC | SCF | DATA | CSFP | DATA | SCF | RSVD |
|------|-----|------|------|------|-----|------|
| 28   | 12  | 130  | 12   | 130  | 10  | 2    |

MOBILE TERMINAL HAVING IMPROVED DIGITAL CONTROL CHANNEL (DCCH) SEARCH PROCEDURE

FIELD OF THE INVENTION

This invention relates generally to radiotelephones and, in particular, to mobile terminals such as those capable of operation with a cellular network.

BACKGROUND OF THE INVENTION

In one modern cellular communications system a mobile station or terminal bidirectionally communicates with a Base Station (BS), Mobile Switching Center (MSC) and Interworking Function, referred to collectively as the BMI. In this system, referred to in the art as IS-136, it is possible for the mobile terminal to use digital traffic and control channels which are organized in a time division duplex (TDM) format with a slotted frame structure. The slotted frames are further organized into a logical structure comprised of repeating Superframes and Hyperframes.

FIG. 4 illustrates a conventional TDM frame format that is used by this system in the forward direction, i.e., from the BMI to the mobile terminal. One frame is composed of six slots, each of which is partitioned into a plurality of fields. Of most interest to this invention are the 12-bit Coded Digital Verification Code (CDVCC) and the 11-bit Coded Digital Control Channel Locator (CDL) fields that are transmitted in a digital traffic channel.

The content of the CDVCC field is defined in IS-136.2, Rev. A, Section 1.2.5, as being a 12-bit field permitting 255 distinct values of CDVCC. The DVCC is an 8-bit word which is coded using a (15,11) Hamming code shortened to form the 12-bit CDVCC.

The content of the CDL field is defined in IS-136.2, Rev. A, Section 1.2.6, as containing a coded version of Digital Control Channel (DL) values. The CDL provides information that may be used by the mobile terminal to assist in the location of a Digital Control Channel (DCCH). For cellular frequencies, a properly decoded DL value indicates that a DCCH may be found on an RF channel number in the range ((8*DL)+1) to ((8*DL)+8), provided the RF channel number is valid. For PCS frequencies, the DL to channel number mapping is given by ((16*DL)+1) to ((16*DL)+16).

The channel encoding of the DL into CDL is said to be similar to that of the CDVCC. That is, the d7 bit is omitted (set to zero) in the encoding process and is not transmitted. Seven bits of the CDL are thus data bits and convey the DCCH RF channel information, while the remaining four bits are used for performing a cyclic redundancy check (CRC) calculation.

When a mobile terminal is powered on it begins to search for a control channel, either digital or analog (the digital control channel (DCCH) is preferred). The purpose of the CDL is to aid the mobile terminal in locating a DCCH.

However, due to RF channel impairments, such as fading and the like, and due to the relatively short length of the CDL field, it is possible that the 11 bits containing the CDL are correctly decoded and the CRC calculation indicates the presence of valid data, even when the data is incorrectly received. In this case the mobile terminal will attempt to tune to the erroneously indicated RF channel to locate and synchronize to a non-existent DCCH. This type of failure can significantly increase the amount of time that the mobile terminal must spend before it finally comes to the system serving state where it is able to originate and/or receive calls and messages.

OBJECTS OF THE INVENTION

It is thus a first object of this invention to provide an improved method for acquiring a digital control channel with a mobile terminal.

It is further object of this invention to provide a method to verify the accurate reception of the CDL before the mobile terminal tunes to an indicated DCCH RF channel.

SUMMARY OF THE INVENTION

The foregoing and other problems are overcome and the objects of the invention are realized by methods and apparatus in accordance with embodiments of this invention. A method of this invention is disclosed for operating a wireless mobile or user terminal of a type that receives a TDM signal from a wireless system, the TDM signal being comprised of slots partitioned into fields. One of the fields is a control-related field containing information that is used by the user terminal to locate a radio channel that transmits a control channel required to access the wireless system. The method comprises the steps of: (a) receiving a slot and decoding a predetermined first field from the slot, the predetermined first field being a field other than the control-related field; (b) determining if the decoded first field was correctly received; (c) only if it is determined that the first .field was correctly received, determining if the control-related field from the slot was also correctly received; (d) if it is determined that the control-related field was also correctly received, determining if the steps (a)–(c) have been executed n times, where n is a positive integer that is equal to or greater than one; and (e) if yes, using information from the control-related field to locate a radio channel that transmits a control channel required to access the wireless system.

In a presently preferred, but not limiting, embodiment of this invention, a method is disclosed for operating a wireless user terminal to obtain access to a Digital Control Channel (DCCH) transmitted on a TDM radio channel of a wireless communications system, which also includes at least one TDM radio channel that transmits a Digital Traffic Channel (DTC). The DCCH and DTC are each comprised of slots partitioned into fields. The method comprises a first step of (a) tuning a receiver to a radio channel, receiving a first slot, and decoding a predetermined first field from the first slot. The predetermined first field is a 12-bit Coded Superframe Phase (CSFP) field if the radio channel conveys a DCCH, or a 12-bit Coded Digital Verification Color Code (CDVCC) if the radio channel conveys a DTC. A second step of the method calculates a CRC over the first field to determine if the first field is the CSFP field. If the first field is determined to be the CSFP field, the user terminal assumes that the radio channel conveys the DCCH and then uses information from the DCCH to access the wireless system. If the first field is determined not to be the CSFP field, the user terminal assumes that the radio channel conveys a DTC, and the user terminal then calculates a CRC over the first field to determine if the CDVCC field was correctly received. If the CDVCC field is determined to be correctly received, the user terminal then calculates a CRC over the CDL field of the DTC slot to determine if the CDL field was correctly received. If the CDL field is determined to be correctly received, and after both the CDVCC and CDL fields are correctly received from n slots, where n is a positive integer that is equal to or greater than one, the user terminal employs the CDL field to identify a radio channel that conveys a DCCH, thereby enabling the user terminal to access the system.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
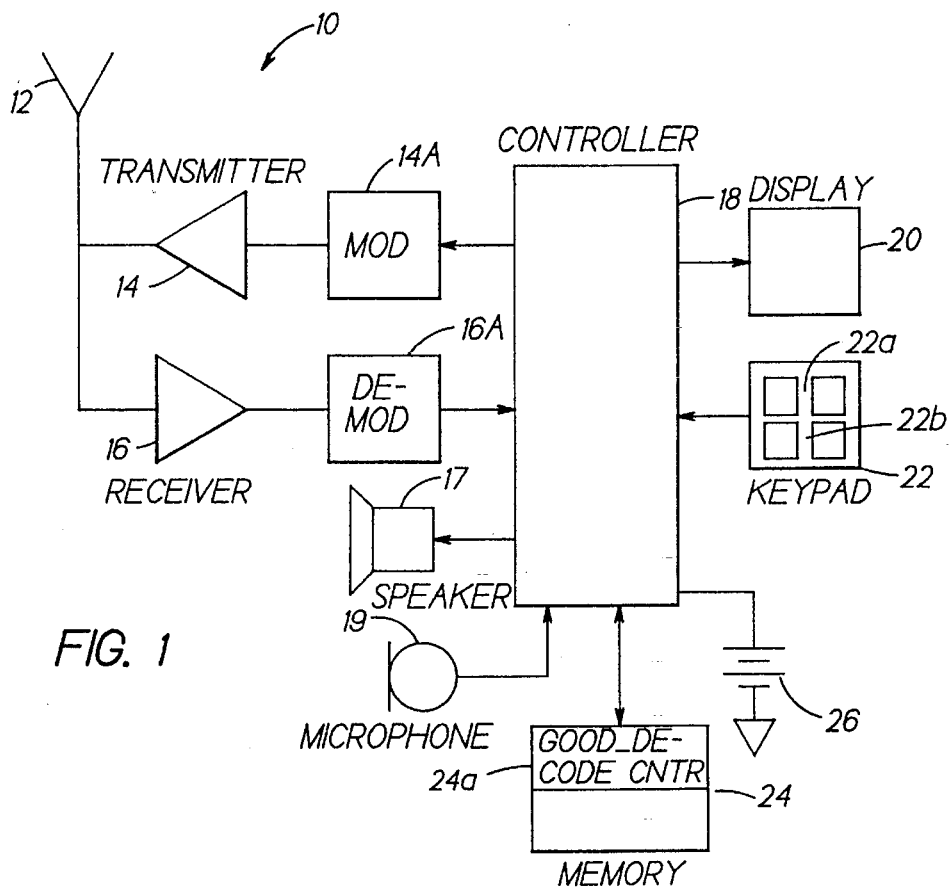
FIG. 1 is a block diagram of a mobile terminal that is constructed and operated in accordance with this invention.
Figures 2, 5:
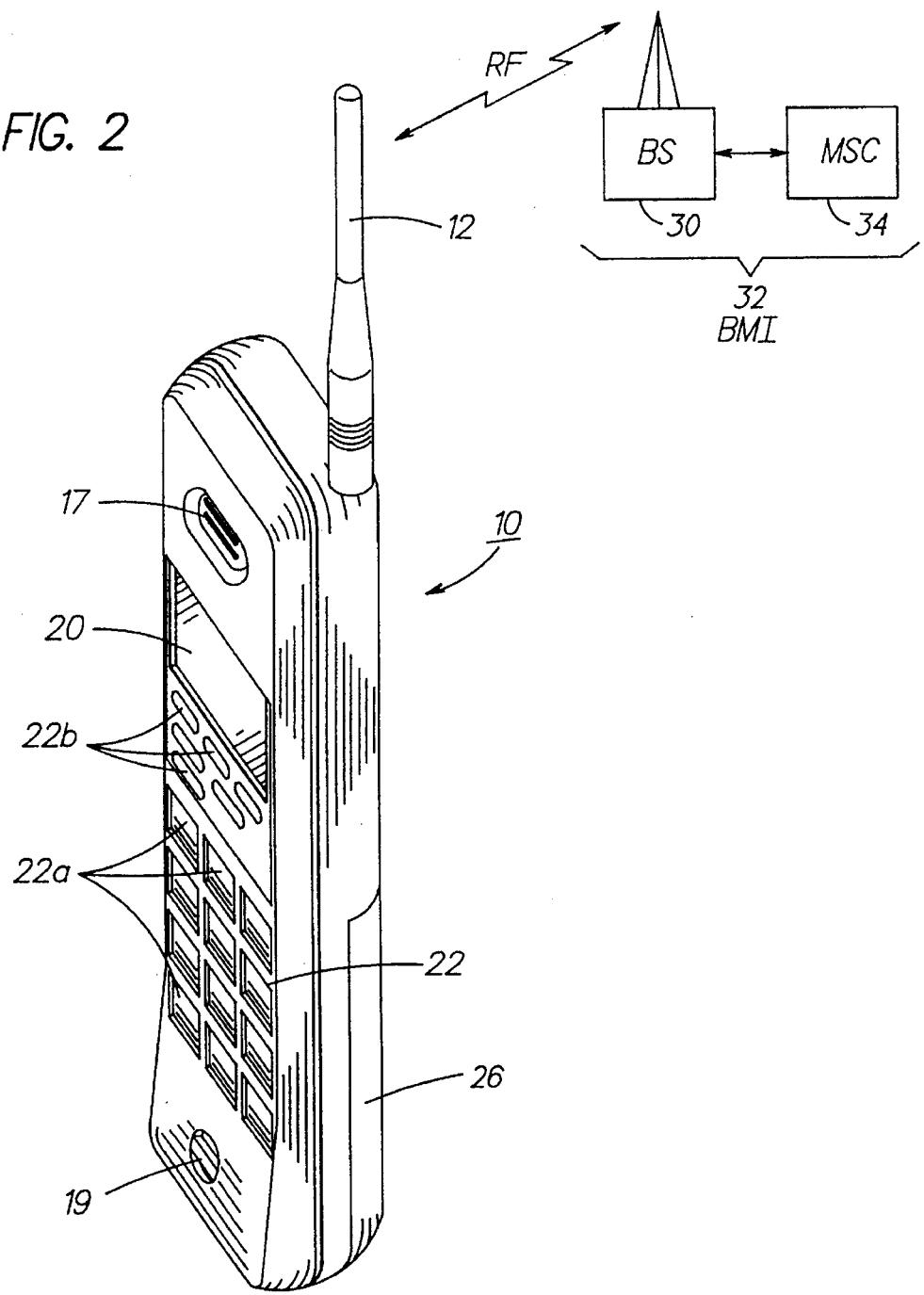
FIG. 2 is an elevational view of the mobile terminal shown in FIG. 1, and which further illustrates a cellular communication system to which the mobile terminal is bidirectionally coupled through wireless RF links.
FIG. 5 illustrates a conventional forward digital control channel (DCCH) slot format.

Reference is made to FIGS. 1 and 2 for illustrating a wireless user or mobile terminal 10, such as but not limited to a cellular radiotelephone, that is suitable for practicing this invention. The mobile terminal 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile terminal 10 is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile terminal, or for use only in TDM type systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating with any of a number of other standards besides IS-136 (DAMPS), such as GSM, and IS-95 (CDMA). Narrow-band AMPS (NAMPS), as well as TACS, mobile terminals may also benefit from the teaching of this invention. It should thus be clear that the teaching of this invention is not to be construed to be limited to any one particular type of mobile terminal or air interface standard.

The operating program in the memory 24 includes routines to present messages and message-related functions to the user on the display 20, typically as various menu items. The memory 24 also includes routines for implementing the method described below in relation to FIG. 3.

Figure 3:
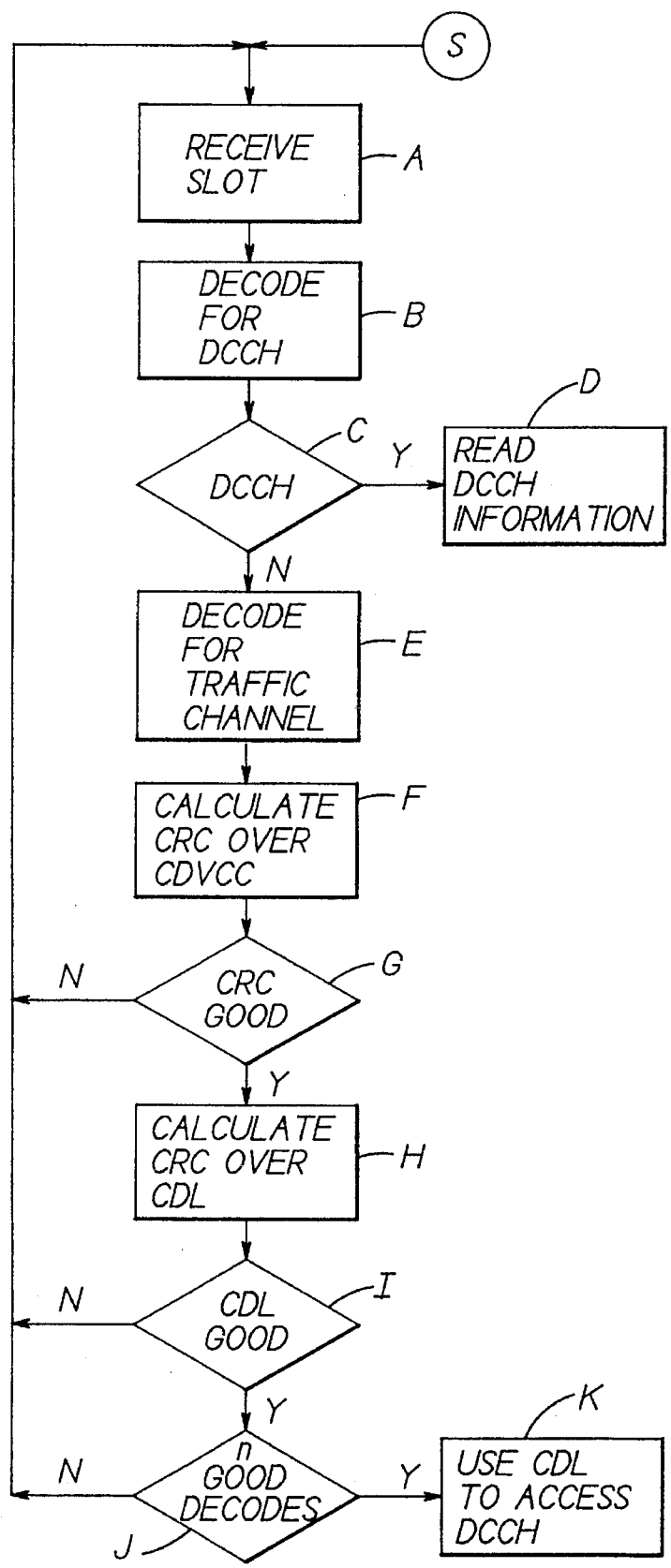
FIG. 3 is a logic flow diagram illustrating a method in accordance with this invention.

Reference is now made to FIG. 3 for illustrating a method in accordance with this invention.

At the connector labelled S the mobile terminal 10 Starts the DCCH acquisition process. At Block A the mobile terminal 10 receives a slot. It is possible that the mobile terminal 10 has initially tuned the receiver 16 to a DCCH. For example, the mobile terminal 10 may have stored in the memory 24 the channel number of the DCCH that is last used. To determine if the mobile terminal 10 has tuned to an RF channel that conveys a DCCH, the mobile terminal 10 first seeks a 12-bit Coded Superframe Phase (CSFP) field which is transmitted from the BMI to the mobile terminal on the DCCH (FIG. 5). As is stated in IS-136.1, Rev. A, Section 4.4.8, the CSFP field is used to convey information regarding the Superframe Phase (SFP) so that the mobile terminal can find the start of the Superframe. It is also stated that the content of this field can be used to discriminate between a DCCH and a Digital Traffic Channel (DTC) in that the CSFP of a DCCH and the CDVCC of a DTC have no common codewords. This is accomplished by using the same basic coding method together with inverting the CRC checkbits of all CSFP codewords before transmittal.

Generally speaking, and as will be made apparent in the following discussion of FIG. 3, the mobile terminal 10 exploits this feature by first determining if it is tuned to a DCCH. If it is, then the DCCH seek phase is terminated and the mobile terminal uses the DCCH information to access the BMI. If the mobile terminal 10 is not tuned to a DCCH, then the mobile terminal 10 assumes that it is tuned to a DTC. In this case the mobile terminal 10 then employs CRC calculations on both the CDVCC and CDL fields to verify that the radio channel and the CDL are correctly received before tuning to the radio channel that is indicated by the CDL as being a DCCH radio channel.

Figure 4:
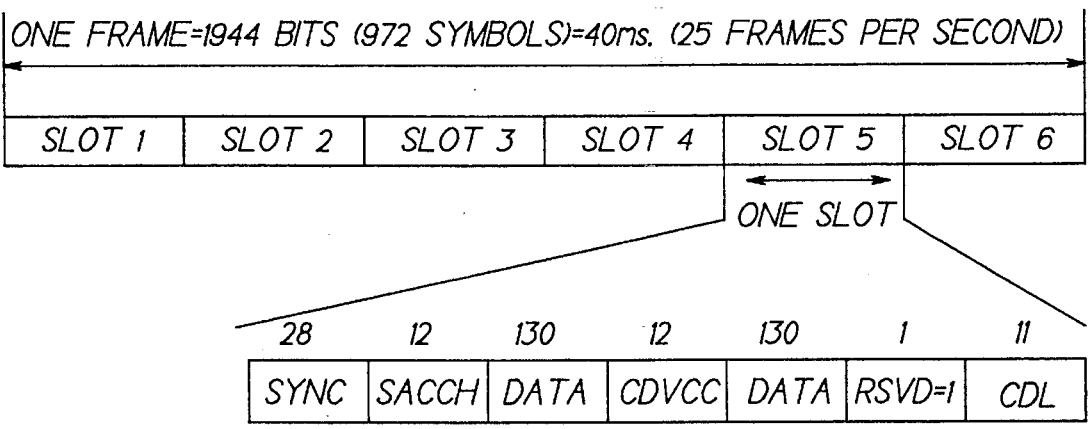
FIG. 4 illustrates a conventional forward digital traffic channel (DTC) frame and slot format.

It should be noted, when comparing the DTC CDVCC field of FIG. 4 with the DCCH CSFP field of FIG. 5, that both fields are 12 bits in length, and are located 170 bits after the beginning of the slot. That is, both fields have the same length and occur at the same point in the slot.

At Block B the mobile terminal 10 decodes the possible CSFP field and performs a first CRC calculation to determine at Block C if the field was correctly decoded, thereby indicating that the mobile terminal 10 has received a DCCH. If yes, control passes to Block D where the mobile terminal 10 reads the DCCH information and continues the system acquisition process.

If no at Block C, indicating that the mobile terminal 10 has not tuned to a DCCH, the mobile terminal 10 instead decodes the field as a CDVCC field at Block E (thus assuming that is has tuned to a DTC as shown in FIG. 4). At Block F the mobile terminal calculates the CRC over the decoded CDVCC field and at Block G determines if the CRC indicates that the CDVCC has been correctly received. If no, control passes back to Block A to receive another slot (and to possibly also tune the receiver 16 to another RF channel).

If yes at Block G, indicating that the CRC calculation shows that the CDVCC field has been correctly received, the mobile terminal 10 then calculates the CRC over the 11-bit CDL field. At Block I the mobile terminal determines if the CRC calculation indicates that the CDL field was also correctly received. If no, control passes back to Block A to receive another slot (and to possibly also tune the receiver 16 to another RF channel).

If yes at Block I, indicating that both the CDVCC and the CDL fields were correctly received and decoded, a further check is made at Block J to determine if a good_decode counter 24a (FIG. 1) indicates that n good decodes have occurred, where n is a positive integer that is equal to one or more. In practice, preferred values of n are two or three. If no at Block J, control passes to Block A to receive a further slot from the current DTC.

In a presently preferred embodiment of this invention it is preferred that the n good decodes occur successively. That is, and assuming that n=3, if two good decodes occur in succession, but then a failure occurs, the good_decode counter 24a is reset to zero. However, it is also within the scope of the teaching of this invention to instead look for any n good decodes, and to ignore all or at least some of the failures (e.g., to accept three good decodes out of five attempts).

If yes at Block J, the mobile terminal 10 uses the information in the CDL to calculate the RF channel of a DCCH, as described above, tunes the receiver 16 to access the indicated DCCH, and then continues with the system acquisition process.

The method described above with respect to FIG. 3 has been found to significantly reduce or eliminate erroneous CDL field decoding, and the subsequent tuning of the receiver 16 to a non-existent DCCH. The result is a significant improvement in system acquisition time, which is the desired result.

Although described in the context of preferred embodiments, it should be realized that a number of modifications to these teachings may occur to one skilled in the art. By example, the teaching of this invention is not limited for use with only the CDVCC and CDL fields specified by IS-136, but can be used to advantage when decoding other desired fields. In addition, the value of n could be made variable as a function of, by example, a historical record of a received signal strength indicator (RSSI), bit error rate (BER), and/or word error rate (WER). The CDVCC and CDL fields could also be decoded and error checked in the opposite order to that illustrated in FIG. 3.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless user terminal of a type that receives a TDM signal from a wireless system, the TDM signal being comprised of slots partitioned into fields, one of the fields being a control-related field containing information that is used by the user terminal to locate a radio channel that transmits a control channel required to access the wireless system, comprising the steps of:

(a) receiving a slot and decoding a predetermined first field from the slot, the predetermined first field being a field other than the control-related field;

(b) determining if the decoded first field was correctly received;

(c) only if it is determined that the first field was correctly received, determining if the control-related field from the slot was also correctly received;

(d) if it is determined that the control-related field was also correctly received, determining if the steps (a)–(c) have been executed n times, where n is a positive integer that is equal to or greater than one; and (e) if yes, using information from the control-related field to locate a radio channel that transmits a control channel required to access the wireless system.

2. A method for operating a wireless user terminal of a type that receives a TDM signal from a wireless system, the TDM signal being comprised of slots partitioned into fields, comprising the steps of:

(a) receiving a first slot and decoding a predetermined first field from the first slot;

(b) determining if the decoded first field indicates that the received slot is a first type of slot;

(c) if yes, using information coded in the received slot to access the wireless system;

(d) if no, assuming that the received slot is a second type of slot and determining if the decoded first field was correctly received;

(e) if yes, decoding a predetermined second field from the first slot and determining if the predetermined second field was correctly received; and (f) if yes, using information coded in the predetermined second field to locate a radio channel on which is transmitted the predetermined first type of slot.

3. A method as set forth in claim 2, wherein the step (e) includes a further step of determining if at least the steps (a) through (e) have been executed a predetermined number of times and, if not, a step of executing steps (a) through (e) at least one more time to receive a further slot.

4. A wireless user terminal of a type that receives a TDM signal from a wireless system, the TDM signal being comprised of slots partitioned into fields, wherein some slots are traffic channel slots and some slots are control channel slots, said terminal comprising a receiver and a controller coupled to the receiver for decoding information contained in received slots, said controller operating with said receiver to receive a first slot and to decode a predetermined first field from the first slot; said controller operating to determine if the decoded first field indicates that the received slot is a control channel slot; if yes, said controller being operable to use information coded in the received control channel slot to access the wireless system and if no, said controller assuming that the received slot is a traffic channel slot and determining if the decoded first field was correctly received; if yes, said controller being operable to decode a predetermined second field from the first slot and to determine if the predetermined second field was correctly received; and if yes, said controller being further operable to use information coded in the predetermined second field to tune said receiver to an indicated radio channel on which is transmitted a control channel slot.

5. A method for operating a wireless user terminal to obtain access to a Digital Control Channel (DCCH) transmitted on a TDM radio channel of a wireless communications system that also includes at least one TDM radio channel that transmits a Digital Traffic Channel (DTC), the DCCH and DTC each being comprised of slots partitioned into fields, comprising the steps of:

(a) tuning a receiver to a radio channel, receiving a first slot, and decoding a predetermined first field from the first slot, the predetermined first field being a 12-bit Coded Superframe Phase (CSFP) field if the radio channel conveys a DCCH or a 12-bit Coded Digital Verification Color Code (CDVCC) if the radio channel conveys a DTC;

(b) calculating a CRC over the first field to determine if the first field is the CSFP field;

(c) if yes, assuming that the radio channel conveys the DCCH and using information from the DCCH to access the wireless system;

(d) if no, assuming that the radio channel conveys a DTC and calculating a CRC over the first field to determine if the CDVCC field was correctly received;

(e) if yes, calculating a CRC over the CDL field to determine if the CDL field was correctly received; and (f) if yes, and after both the CDVCC and CDL fields are correctly received from n slots, where n is a positive integer that is equal to or greater than one, using the CDL field to identify a radio channel that conveys a DCCH.

* * * * *